United States Patent [19]

Witt

[11] Patent Number: 4,519,174

[45] Date of Patent: May 28, 1985

[54] STAIN-RESISTANT EARTHEN ARTICLES, GROUT AND FLOOR AND WALL SURFACES COMPOSED THEREOF

[75] Inventor: Alvin E. Witt, Media, Pa.

[73] Assignee: PermaGrain Products, Inc., Media, Pa.

[21] Appl. No.: 431,610

[22] Filed: Sep. 30, 1982

Related U.S. Application Data

[62] Division of Ser. No. 292,018, Aug. 11, 1981, Pat. No. 4,407,884.

[51] Int. Cl.³ .............................................. E04F 13/18
[52] U.S. Cl. .................................. 52/389; 52/309.17; 52/415
[58] Field of Search ................................. 52/389–390, 52/309.17, 415

[56] References Cited

U.S. PATENT DOCUMENTS

| | | | |
|---|---|---|---|
| 715,932 | 12/1902 | Alcan | 52/390 |
| 2,850,890 | 9/1958 | Rubenstein | 52/309.17 |
| 3,025,641 | 3/1962 | Ahtiainen | 52/415 |
| 3,546,007 | 12/1970 | Douglas | 428/497 |
| 3,709,719 | 1/1973 | Welt . | |
| 3,721,579 | 3/1973 | Barrett . | |
| 3,808,030 | 4/1974 | Bell . | |
| 3,808,032 | 4/1974 | Bosco . | |
| 4,174,230 | 11/1979 | Hashimoto et al. | 106/109 |
| 4,215,179 | 7/1980 | Melamed et al. | 428/454 |
| 4,225,651 | 9/1980 | Hutton et al. | 428/703 |
| 4,263,372 | 4/1981 | Emmons et al. | 428/454 |

*Primary Examiner*—James L. Ridgill, Jr.
*Attorney, Agent, or Firm*—Eugene E. Renz, Jr.

[57] ABSTRACT

Thin, strong, composite masonry-plastic articles having an earthen body impregnated with an in situ polymerized plastic and a drying oil or semi-drying oil; a mastic for forming a stain resistant grout comprising about 70% to 80% sand and about 20% to 30% of a plastic binder; stain-resistant wall and floor structures comprising said composite articles and grout; and a method for installing such wall and floor structures are described.

24 Claims, No Drawings

STAIN-RESISTANT EARTHEN ARTICLES, GROUT AND FLOOR AND WALL SURFACES COMPOSED THEREOF

This is a divisional of application Ser. No. 06/292,018 filed Aug. 11, 1981, now U.S. Pat. No. 4,407,884 issued Oct. 4, 1983.

BACKGROUND OF THE INVENTION

The use of earthen tiles, bricks or similar articles as a floor or wall covering in high traffic areas has become very popular in recent years. However, such floor covering materials are subject to the serious disadvantage that they are easily stained or discolored and, therefore, do not retain an attractive appearance unless sealed in some way to prevent such staining. Previously available sealing materials and techniques have provided a protective layer on the surface of the floor covering which is subject to wear, particularly in high traffic areas, and must, therefore, be periodically renewed. This, of course, entails substantial expense in material and labor to maintain an acceptable appearance for such floors.

Moreover, previously available floor tiles have necessarily been relatively thick, e.g. from about ½" to about 2" in order to provide sufficient breaking strength. Such thicknesses cause problems in installation especially in remodeling work and also add to the cost shipping the tiles due to the added weight.

Another serious problem with floors generally composed of floor tiles, is that they are generally installed with a cement type grout, which is also very susceptible to staining and must, therefore, also be sealed.

THE PRIOR ART

Traditional earthen flooring materials such as stone, cement, brick and gypsum floor and wall tiles, and bricks required sealing to prevent staining and discoloration by a wide variety of materials capable of penetrating the porous tiles or bricks and then drying or curing in situ to fill and seal the pores of the material and provide a film or layer of impregnant on the surface of the tile or brick. Such sealers have generally comprised a resin of some sort in a volatile liquid vehicle which evaporates or dries to leave a resinous film. Such resinous films provide some protection and have proven fairly satisfactory for home use in low or moderate traffic areas, but are not sufficiently wear-resistant for high traffic areas such as those in public or commercial buildings.

A process for imparting long lasting gloss, color depth properties, and stain resistance to wood tiles for floor and wall covering use is described in Bosco U.S. Pat. No. 3,808,032, issued Apr. 30, 1974. This process comprises impregnating the wood with a monomer polymerizable by organic free radicals, polymerizing the monomer in situ in the wood, and thereafter coating the surface of the wood with a penetrating solution comprising a drying oil or a semi-drying oil. The polymerization is accomplished by exposure to ionizing radiation, and is catalyzed by including from about 0.01 to about 0.5 weight percent of a free radical polymerization agent in the monomer. The reaction is accelerated by heat. Suitable monomers include methyl methacrylate, vinyl chloride, vinyl acetate, styrene and mixtures of these monomers. Suitable drying oils include soybean, linseed, tall, tung, peril a, oitica, cottonseed, corn, sunflower and dehydrated castor oil and mixtures of these oils. The preferred drying oil is doubly boiled linseed oil. The oils are applied in amounts of about 0.5 to about 2.0 gallons per 6000 square feet of wood surface. The penetrating solutions comprise the oil of an organic hydrocarbon solvent in an oil to solvent ratio from about 3:1 to 1:3. The preferred solvents are naptha, Stoddard solvent and petroleum ether. From about 0.01 to about 1 weight percent of a siccative agent such as cobalt, lead, zinc and manganese salts may be added to the penetrating solution. In this way, wood tiles are obtained which have a permanent gloss, water spotting resistance and stain resistance.

A similar process for making wood-plastic composite tiles is described in Bell U.S. Pat. No. 3,808,030, also issued on Apr. 30, 1974. In this process a halo-organophosphorous composition is included in the monomer before polymerization to impart flame retardancy and to prevent laking of the impregnant on the surface of the tiles. It is also noted that the penetration of the polymerized plastic is so deep into the wood that the tiles may be sanded deeply before finishing by buffing without damaging the impregnated plastic. This patent also described preferred finishing techniques to produce floor tiles having good wear and stain resistance.

Barrett U.S. Pat. No. 3,721,579 issued Mar. 20, 1973 describes methods and apparatus for impregnating wood or concrete substrates with a monomer and polymerizing the monomer in situ by irradiation. This patent teaches how to control the temperature and degree of polymerization in order to polymerize the monomer in the substrate without polymerizing the monomer both surrounding the substrate and how to avoid vaporizing the moisture in the wood. This patent also lists a large number of suitable monomers for impregnation of the substrates. A large number of substrates are also suggested, including preformed concrete shaped in the form of flooring or wall tiles.

Welt U.S. Pat. No. 3,709,719 issued Jan. 9, 1973, describes a process for making a masonry-plastic material having a glossy, smooth surface, improved wear and resistance properties, and a low porosity, which comprises impregnating a masonry material with a monomer which polymerizes on exposure to radiation. The masonry material is inserted in a bath of monomer and the monomer in the masonry material is polymerized in situ by exposing the bath to a source of radiation sufficient to polymerize the impregnated monomer but insufficient to polymerize the monomer bath.

In view of the foregoing, it is apparent that the art has attempted to solve the problem of staining and discoloration of floor tiles used in high traffic areas. However, the art has not previously solved the problem of maintaining a floor of such earthen or brick tiles in attractive condition, since it has not found any way to prevent the grout between the tiles from becoming stained or discolored. Therefore, even the use of stain resistant brick or masonry tiles fail to provide a floor having a long lasting attractive appearance since the grouting soon becomes discolored.

It is an object of the present invention, therefore, not only to provide relatively thin brick or earthen floor tiles but strong and light earthen floor tiles of improved stain resistance, but also to provide stain resistant grout and an installed grouted floor or wall which will remain undamaged and free of stains or discoloration for prolonged periods of time even in high traffic areas.

It is another object of the invention to provide a thin, stain resistant earthen floor which can be installed in a single simple operation.

SUMMARY OF THE INVENTION

The present invention relates to composite earthen-plastic articles such as tiles or bricks having improved stain resistance and strength, to a novel mastic composition for installing the earthen-plastic articles which sets up to form a stain-resistant grout, and to the resulting wall or floor surfaces which are suitable for use in high traffic areas and which remain attractive for long periods of time without special maintenance since both the earthen-plastic articles and the grout making up the exposed surfaces are stain-resistant.

The stain-resistance and improved strength of the earthen-plastic articles is achieved by double impregnation of the materials. The articles are first impregnated with a suitable polymerizable monomer which is then polymerized in situ in the body of the earthen article according to methods known per se, in the art. This impregnation not only improves the stain-resistance of the articles but also their strength, thus permitting the use of relatively thin articles even in high traffic areas. The resulting plastic-impregnated earthen tile or bricks are then doubly impregnated with a penetrating solution of a drying oil or semi-drying oil to further improve their stain-resistance. This double impregnation extends deeply into the body of the article which may, therefore, be ground to achieve a smooth surface and then buffed to achieve a high polish or any other desired surface finish. The resulting articles are highly stain-resistant and exceed the ANSI specification for strength, thus making them suitable for use in paving the walls and floors of high traffic areas. The finished articles may be derived from any suitable earthen starting material including, without limitation, fired clay based brick, unfired non-clay brick derived from gypsum, pumice or the like, cement compositions derived from Portland cement, natural stone, slate or marble, turquoise, coral or any other fossil, shell or other earthen material having acceptable strength when supported on a suitable substrate, subflooring or wall board.

DETAILED DESCRIPTION OF THE INVENTION

THE EARTHEN-PLASTIC ARTICLES

The earthen-plastic articles of the invention having improved stain-resistance may be derived from any known earthen article or composition; the term "earthen" as used herein being intended to mean any solid material derived from the earth or found in nature or similar synthetic materials which are sufficiently porous to be impregnated as described below. Such materials include without limitation, natural or synthetic stone, slate, marble or turquoise, coral or other fossils or shells, concrete, Portland or other cement compositions, earthenware of any type including fired or unfired clay base or non-clay based bricks, or any other earthen composition. The articles are preferably initially formed in the desired shape, although they may be cut to shape after impregnation. Generally, the articles are formed into thin tiles or bricks of the desired size, shape and thickness before impregnation. The term "thin" as used herein means less than about $\frac{1}{2}''$, e.g. about 5/16''.

The earthen articles are then impregnated with a suitable polymerizable monomer and the monomer is then polymerized in situ within the earthen article to form the first stage earthen-plastic articles of the invention. These articles are then impregnated with a penetrating solution of a drying oil or semi-drying oil and then finished as desired by grinding and buffing to form the finished stain-resistant earthen-plastic articles. All of this is accomplished in the same way as has been taught in the art previously with respect to wood articles in Bell U.S. Pat. No. 3,808,030 and Bosco U.S. Pat. No. 3,808,032, both issued Apr. 30, 1974; the entire disclosure of each of said patents being incorporated herein by reference.

The impregnation with the selected monomer is carried out in an impregnation/irradiation vessel, known in the art per se, of suitable dimensions such as a vessel of about 1 ft×2 ft×18 ft. After introducing the articles to be impregnated to the vessel, it is placed in a 3' diameter vessel for impregnation. The vessel is then evacuated, suitably to about 20–30 millimeters mercury pressure for a suitable period, e.g., about 2 hours. The impregnant is then introduced through suitable valving to completely immerse the articles. The head space is then filled with an inert gas such as nitrogen under pressure, suitably about 80 psi for a suitable period of time, e.g. 3 hours. The process gas should be free of oxygen since oxygen inhibits the radiation polymerization reaction. The period required for suitable impregnation will, of course vary with the earthen material depending upon its porosity, the viscosity of the monomer and other factors and may be determined for each material by trial and error. Generally speaking, an impregnation period of about 2 to about 3 hours is generally adequate. This time and other conditions may be varied to control the depth of impregnation as desired. The viscosity or thickness of the monomer must be such that it will penetrate the pores of the particular material to be impregnated.

The pressure is then reduced and the excess monomer is drained from the vessel. The vessel containing the monomer-impregnated articles is placed in the irradiator.

The pool irradiator arrangement may suitably be a tank about 26 feet deep or more, about 50 feet long and about 22 feet wide filled with water. A standard irradiator unit such as a "NEPI" unit or an "NPI" unit may suitably be placed on the floor of the pool irradiator. Such irradiator source units available from NUMEC produce 500,000 curies of irradiation from cobalt 60 and comprise 37 inch pencils arranged in a plaque 12 feet by 9 feet. Any other source unit providing equivalent gamma radiation may be employed. Such an irradiator arrangement operates at ambient temperature and pressure. Handling means are also provided for lowering the canister to the proper pool depth and orienting within the zone of irradiation.

The canister is first preferably flushed several times to purge it of oxygen. This is suitably accomplished by the use of nitrogen at about 5 psi. The cover of the canister is then sealed and the canister is lowered into the water in the pool and passed slowly through the irradiation zone close to the source of irradiation. Irradiation is carried out for a predetermined period of time, for example, about 10 hours and provides a dose of about 1.7 MRAD. The period of treatment and dosage will, of course, vary with the monomer and substrate being impregnated.

Generally speaking, the dosage required to convert a monomer to a polymer varies with the square root of the radiation dose rate. The dosage requirement for complete polymerization of the monomer in the masonry articles is determined by such factors as the type of earthen in question, the type and concentration of the monomer, the presence of impurities, such as oxygen for example, in the impregnant or in the masonry or environment and the use of irradiation activators.

The radiation-induced polymerization causes the monomer molecules to become linked throughout the earthen article forming a network of polymer that envelops the pores of the components thus sealing them in plastic and providing stain resistance. Radiation-induced polymerization, proceeds by a free radical process, and does not require the addition of either heat or catalyst, although both may be used if desired. However, inasmuch as the radiation itself acts as a catalyst, it offers a method of controlling the exothermic polymerization reaction in the substrate, which is difficult to achieve if catalyst and heat are employed.

IMPREGNANT MATERIALS

Vinyl monomers are highly suitable, methyl methacrylate (MMA), being especially preferred, since it is readily available and easily polymerizable. The monomer may be inhibited by Butylate Hydroxide Toluene (BHT) at 35 ppm or by other inhibitors known to the art. Known activators may also be used if desired. Other vinyl monomers are also very useful including the acrylates which are desirable for their elastomeric properties. Suitable examples are ethyl acrylate co-polymers with vinylidene chloride or acrylonitrile. Acrylonitriles and styrenes are also suitable monomers for some applications. The styrenes, however, require relatively large radiation doses as much as 20 times that for methyl methacrylate. Vinyl chloride is also attractive because of its low cost, although it presents handling difficulties known to the art. These monomers may also be mixed as desired and may also be diluted with inert fillers such as silica or bentonite or the like to reduce cost.

A wide variety of other additives may be used such as water repellants, dyes, fungicides, odorants, bacteriostats and the like.

Additives may also be used to reduce the heat of polymerization, radiation requirements and/or the cost of the impregnant. Certain plasticizers can be expected to provide one or all of the foregoing advantages: for instance sebacates, adipates, polychlorinated phenyls or phthalates.

Monomers used for wood and Portland cement impregnation will not work for most earthen materials. The pore structure is such that the monomer will run from the structure and incomplete impregnation will result.

A special methyl methacrylate monomer was developed using varying amounts of a thickening agent. The amount will vary according to the starting material. Thickening agents include long chain acrylics, phosphorus organics, or other compatible polymer materials.

The mastic of the invention is largely composed of sand but has stain resistance imparted thereto by the unique combination of about 20 to about 30% of a suitable stain-resistant plastic binder, preferably an acrylic binder such as polyvinylacetate, and several active materials. These materials include a surface active agent to aid in achieving an intimate wetting or contact with the bricks, tiles or other earthen-plastic articles; a lubricant for the sand-binder composition, and plasticizer to impart strength. It is also desirable to add an agent to prevent freezing of the mastic on storage or during shipping. The resulting mastic when used to install the stain-resistant earthen-plastic articles sets up in about 4 to about 24 hours on exposure to the air to form a solid grout which is also highly stain resistant.

The resulting wall or floor surfaces of the invention are suitable for use even in very high traffic areas, resist damage, and retain an attractive appearance despite such traffic for prolonged periods of time due to the fact that articles are very strong and both the earthen-plastic articles and the grout are highly stain-resistant.

Generally speaking, the loading of impregnant plastic will suitably vary from about 5 to 30% and preferably about 10 to 25% plastic based on the weight of the total earthen-plastic article after polymerization.

EXAMPLE 1

Three hundred fifty square feet of earthen tiles (98% Pumice) were loaded into the impregnation irradiation cannister. Tile size $3\frac{5}{8}'' \times 7\frac{5}{8}'' \times 5/16''$ thick. After a two hour vacuum of 27" of Hg, the monomer was introduced. Monomer consisted of 15% thickening agent, 3% crosslinker and 82% methyl methacrylate. A nitrogen over pressure of 80 psi was maintained for 2 hours to force the liquid into the pores. Excess monomer was drained from the vessel and the vessel and product were irradiated with a cobalt 60 source to a total dose of 1.7 megarads.

The resulting product consisting of 74% earthen materials and 26% plastic was processed through two single head sanders utilizing 30 and 50 grit paper. The sanded composites were continuously contacted with a print roller to deposit double boiled linseed oil on the surface. Application rate was 6,000 square feet per gallon. After the oil application, the samples were buffed and boxed. The resulting product was stain resistant, and had structural properties that exceeded ANSI specifications. Thus a product that under no situation could be used as a flooring material, was converted to a superior flooring material.

EXAMPLE 2

Four hundred twenty five square feet of thin fired clay base bricks were loaded into the impregnation irradiation cannister. Brick size was $2\frac{1}{4}'' \times 7\frac{1}{2}'' \times 5/16''$. After a two hour vacuum of 27" of Hg, the monomer was introduced. Monomer consisted of 3% crosslinking agent and 97% methyl methacrylate. A nitrogen over pressure of 80 psi was maintained for 3 hours to force the liquid into the pores. Excess monomer was drained from the vessel and the vessel and product was irradiated with a Cobalt 60 source to a total dose of 1.7 megarads.

The resulting product consisting of 90% earthen materials and 10% plastic was processed through two single head sanders utilizing 30 grit paper. The sanded composites were continuously contacted with a print roller to deposit double boiled linseed oil on the surface. Application rate was 4,000 square feet per gallon. After the oil application the samples were buffed and boxed.

The resulting product was stain resistant, and had structural properties that exceeded ANSI specifications. Thus a 5/16 inch thick product that could not be used as a flooring material was converted to a superior flooring material.

EXAMPLE 3

Three hundred square feet of coral tile were loaded into the impregnation irradiation vessel. Tile size was 6"×6"×⅜". After 2 hours vacuum of 27" of Hg, the monomer was introduced. Monomer consisted of 10% thickening agent, 3% crosslinker and 87% methyl methacrylate. A nitrogen over pressure of 80 psi was maintained for 2 hours to force the liquid into the pores. Excess monomer was drained from the vessel and the vessel and product were irradiated with a Cobalt 60 source to a total dose of 1.7 megarads. The resulting product consisting of 76% earthen materials and 24% plastic was processed through two single head sanders utilizing 30 and 50 grit paper. The sanded composites were continuously contacted with a print roller to deposit double boiled linseed oil on the surface. Application rate was 5,000 square feet per gallon. After the oil application the samples were buffed and boxed. The resulting product was stain resistant, and had structural properties that exceeded ANSI specifications. Thus a product that under no situation could be used as a flooring material was converted to a superior flooring material.

DOUBLE IMPREGNATION

The earthen-plastic articles obtained as above have some stain resistance but that property is greatly improved by a second impregnation of the article with a penetrating solution of a drying oil or semi-drying oil. While such a second impregnation has been suggested previously for wood articles in Bosco U.S. Pat. No. 3,808,032 issued Apr. 30, 1970, it was not to be expected that impregnation with drying oils or semi-drying oils would have a beneficial effect upon the stain resistance of earthen articles.

In accordance with the invention, the earthen-plastic composite is treated with a small, controlled amount of a drying or semi-drying oil. The result of this treatment is to further coat the pores of the products. The drying or semi drying oil becomes absorbed in the pores, and undergoes a combination of oxidation and condensation reactions which result in a mixture of high molecular weight compounds.

Suitable drying and semi-drying oils include soybean, linseed, tall, tung, perilla, oitica, cottonseed, corn, sunflower, dehydrated castor oil and the like. The preferred drying oil is doubly boiled linseed oil.

While it is greatly preferred to apply the process of the invention to a continuous process at the point of manufacture of the earthen-plastic composites, it can also be applied very successfully to earthen-plastic composite floors or walls which have already been installed. The preferred processes are somewhat different when performed "in field," and at point of manufacture of the composites. When "in field", it is preferred to apply the drying oil or semi-drying oil to the earthen-plastic composite in a solvent carrier. Suitable solvent carriers include low boiling petroleum distillates, such as mineral spirits, naphtha (VM&P type), Stoddard solvent, petroleum ether and the like. The volume ratio of drying oil to solvent carrier is suitably from about 3:1 to 1:3 and preferably from about 1.5:1 to 1:1.5. The preferred solvent carrier is Stoddard solvent. After application, the solvent carrier vaporizes, leaving the drying oil or semi-drying oil as a coating on the pores of the earthen-plastic article, but does not form a continuous film over the entire surface of the composite.

Any suitable means for applying the required amount of formulation can be used.

In the "in field" case, a sponge mop is one very suitable means, especially when the process is being applied to flooring composites already in place. The amount of drying oil and solvent carrier formulation applied is between one gallon per 1,000 square feet and one gallon per 2,500 square feet, preferably one gallon to between 1,300 and 2,000 square feet.

In the "point of manufacture" case, the drying oil is supplied to the surface of the earthen-plastic composite in amounts sufficient to coat the individual surface pores, but insufficient to coat the entire surface, preferably from about 0.5 to about 2.0, more preferably from about 0.9 to about 1.1 gallons of drying or semi-drying oil per 6,000 square feet of earthen-plastic composite surface. Preferably, the drying or semi-drying oil is applied in a continuous process at speeds and conditions designed to insure application of the desired amount of formulation per square foot. One suitable means of continuous application is a rubber type print roll having a pattern embossed thereon to "print" the formulation in a pattern as the masonry-plastic composite is passed under the roller. The pressure on the roller preferably can be adjusted to help control the application of the desired amount of formulation.

Optionally, a siccative agent is incorporated in the formulation to accelerate the polymerization of the drying or semi-drying oil after it is applied to the masonry-plastic composite surface. Suitable siccative agents include heavy metal salts, such as naphthenates or neodecanates of cobalt, lead, manganese, or zinc and other drying accelerators. Mixtures of salts are especially suitable and are preferred. Preferred amounts of siccative agent are from about 0.01 to 1 weight percent based on the weight of the formulation, and more preferably from about 0.05 to 0.5 weight percent.

While not intending to be bound by any theory of the invention, it is thought that the drying or semi-drying oil becomes absorbed in the pores on the surface of the composite and polymerizes to form a water-resistant finish. Without the drying or semi-drying oil treatment, water coming in contact with the composite surface has a tendency to penetrate the pores, adversely affecting the appearance, gloss and beauty of the composite. The drying or semi-drying oil treatment permanently prevents water spots and water staining on the earthen-plastic articles.

After application of the formulation in accordance with the process of the invention, it is preferred to again buff the surface to remove any excess material. One suitable means for this buffing is use of a nylon pad. To obtain the most aesthetically pleasing properties, it is preferred to buff one more time with a nylon pad to polish the floor or wall after about 24 hours from the application of the formulation. Optionally, heat and pressure are applied during the buffing and have been noted to have a beneficial effect.

STRENGTH IMPROVEMENT AND OTHER PROPERTIES

It has been found that the breaking of the new earthen-plastic articles is not only greatly increased over that of the unimpregnated starting materials, but exceeds by over 60% the (ANSI) Specification for such flooring materials. Moreover, the bonding strength and resistance to wear of the new articles also greatly exceed the ANSI specifications. Still further, the moisture absorption of the new articles is far less than that permitted by the ANSI specifications.

More specifically, the properties of the new articles exceed the ANSI specifications as shown in the table below.

| Property | ANSI Specification | Articles of the Invention | |
|---|---|---|---|
| | | F-Series | S-Series |
| Bond Strength | 50 psi | 80 psi | 80 psi |
| Moisture Absorption | <5% | <0.5% | 1.3% |
| Break Strength | 250 psi | 500 psi | 400 psi |
| Resistance-to-Wear | 35 | 61 | 51 |

THE MASTIC AND GROUT

As noted above, the present invention also includes an improved mastic composition for installing the stain-resistant articles which sets up into a stain-resistant grout.

The new mastic is composed largely, i.e. about 70 to 80% by weight, of an inert particulate filler such as a suitable sand or silica. The other essential ingredient of the mastic is a stain-resistant plastic binder for the sand which impart stain-resistance to the grout after it is set. The preferred binder is polyvinyl acetate although other equivalent polymers may be employed. The mastic contains about 20 to 30% of such a binder.

Other active additives are included in the mastic. For example, it is preferred to include a surface active agent to aid in wetting the surfaces of the sand and articles with the mastic binder and impart surperior stain resistance. Many non-ionic surfactants may be employed for this purpose, the alkylphenyl polyether alcohols being especially useful. The preferred surfactant, which may be used in amounts up to about 0.5% or more, is octylphenoxypolyethoxyethanol which is available commercially under the trademark "TRITON X405". The material contains about 40 monomer units per molecule.

It is also desirable to include a lubricant for the sand and binder. Suitable lubricants include the polymethyl siloxanes among othersknown to the art. The preferred lubricant is poly dimethyl siloxane which is available commercially under the trade designation "Silicone Fluid SWS-101" from SWS Silicones Corporation of Adrian, Mich.

Another desirable component of the mastic is a plasticizer many of which are known to the art. The preferred plasticizer is polyoxyethylene aryl ether which may be used in amounts up to about 0.5% or more and which is available under the trademark "PYCAL 94" from ICI Americas Inc. of Wilmington, Del.

The preferred binder as noted above, is polyvinyl acetate (PVA). An especially preferred PVA is a vinyl acetate homopolymer emulsion available under the trademark "VINAC XX-210 to 240" which has chemical Abstract Registry number 9003-20-7. Other equivalent polyvinyls may also be employed if they bind the sand properly and impart stain-resistance to the set grout.

The mastic may also contain various other additives to impart improved properties. One such is an antifreeze stabilizer to prevent freezing of the viastic on a storage or shipping. The preferred anti-freeze agent is ethylene glycol which may be used in amounts of up to about 1% or more.

INSTALLATION

The ease and simplicity of installation of the improved stain-resistant articles and mastic providing stain-resistant grout constitute one of the primary advantages of the invention. Installation may be carried out on any suitably stable substrate such as a wood, plywood, masonry stone or metal sub-flooring or wood, plywood, chip-board, dry wall or gypsum block wall surface. The paste-like mastic composition is simply spread on the substrate to a suitable thickness and the impregnated articles, whether tiles, bricks or other suitable shaped articles, are placed on the wet mastic and imbedded therein by suitable pressure to force displaced mastic up around the edges of the tile or brick. The usual grout lines of desired width are left between adjacent tiles or bricks. Additional mastic may be troweled into the grout lines and leveled and smoothed as necessary to provide sufficient grout between adjacent tiles or bricks. Excess mastic may be removed from the surface of the masonry articles by wiping in known manner. The mastic is then allowed to set to form the stain-resistant grout and fully stain-resistant floor and wall surfaces of the invention. While setting times will vary, in most cases floors installed in this way can be walked on without damage after about 4 to about 24 hours.

The floor and wall surfaces prepared in this way will provide excellent service even in very high traffic areas and will remain undamaged, unstained, and attractive for long periods of time.

While the articles of the invention are normally installed with visible grout lines, they may also be installed edge to edge without visible intermediate grout. For example, pumice or coral tiles may be closely machined to permit closely fitting joints without grout therebetween; the only grout being below the tile adjacent the substrate.

What is claimed is:

1. A stain- and wear-resistant wall or floor surface comprising:
   a plurality of composite earthen-plastic articles having improved stain-resistance and strength;
   said articles comprising a porous earthen body having a synthetic plastic polymerized in situ therein and being further impregnated with a penetrating solution comprising a drying oil or a semi-drying oil;
   said polymerized synthetic plastic being substantially uniformly distributed throughout said earthen body;
   said drying oil or semi-drying oil also being substantially uniformly distributed throughout said earthen body;
   whereby said articles have a substantially uniform composition throughout the thickness thereof with the pores substantially filled with said plastic and oil to provide said stain-resistance;
   said articles being assembled in said wall or floor surface imbedded in a layer of stain-resistant grout surrounding the edges of said articles and holding them in position in said surface;
   whereby a wall or floor surface is provided having improved breaking strength and stain-resistance.

2. The surface of claim 1 wherein the drying oil is selected from the group consisting of soybean, linseed, tall, perilla, oitica, cottonseed, corn, sunflower, and dehydrated castor oil, or mixtures thereof.

3. A surface of claim 1 wherein the articles are less than about ″ thick and have a breaking strength in excess of the ANSI specification.

4. The surface of claim 5 wherein the polymer is derived from a monomer selected from the group consisting of methyl methacrylate, vinyl chloride, acrylonitrile, vinyl acetate, and styrene, or mixtures thereof.

5. The surface of claim 4 wherein the polymer is polyvinyl acetate.

6. The surface of claim 1 wherein the articles have a body of earthenware.

7. The surface of claim 6 wherein said earthenware body is fired clay base brick.

8. The surface of claim 6 wherein said earthenware body is unfired non-clay brick.

9. The surface of claim 8 wherein the brick comprises gypsum.

10. The surface of claim 8 wherein the brick comprises pumice and a cementitious binder therefor.

11. The surface of claim 8 wherein the brick comprises coral or turquoise.

12. The surface of claim 8 wherein the earthen body comprises Portland cement.

13. The surface of claim 8 wherein the non-clay brick is impregnated before said in situ polymerization with a pre-polymer comprising about 5 to about 10% bentonite.

14. A stain and wear-resistant wall or floor surface of claim 1 wherein said grout is obtained from a mastic comprising:
up to about 80% sand or silica;
up to about 30% or more stain-resistant plastic binder, and a minor amount of a surface active agent which enhances contact between said sand or silica and said binder and which imparts added stain-resistance to the grout obtained from said mastic on setting thereof;
said percentages being by weight of the total mastic composition.

15. A surface of claim 14 wherein said mastic also comprises a lubricant for said sand or silica and a plasticizer for said binder.

16. A surface of claim 14 in which the binder in the mastic is a vinyl homopolymer.

17. A surface of claim 14 in which the binder in said mastic is polyvinyl acetate.

18. A stain- and wear-resistant wall or floor surface comprising;
a plurality of earthen-plastic articles having improved stain-resistance and strength;
said articles comprising a porous earthen body having a synthetic plastic polymerized in situ therein and being further impregnated with a penetrating solution comprising a drying oil or a semi-drying oil;
said plastic and oil being uniformly distributed throughout the volume of said articles to impart strength and stain-resistance thereto;
said articles being assembled in said surface imbedded in a layer of stain resistant grout surrounding the edges of said articles and holding them in position in said surface;
said grout having been obtained by setting and hardening of a mastic composition comprising:
up to about 80% sand or silica;
up to about 30% or more stain-resistant plastic binder; and
a minor amount of surface active agent which enhances contact between said sand or silica and said mastic binder and which imparts added stain-resistance to the grout obtained from said mastic on setting thereof;
said percentages being by weight of the total mastic composition.

19. A surface of claim 18 wherein said mastic also comprises a lubricant for said sand or silica and a plasticizer for said mastic binder.

20. A surface of claim 18 in which the binder in the mastic is a vinyl homopolymer.

21. A surface of claim 18 in which the binder in said mastic is polyvinyl acetate.

22. A surface of claim 18 wherein the surface active agent is non-ionic, the lubricant is polymethylsiloxane and the plasticizer is a polyoxyethylene aryl ether.

23. A surface of claim 18 in which the surface active agent is octylphenoxypolyethoxyethanol and is present in an amount of up to about 0.5% or more; the lubricant is polydimethylsiloxane in an amount up to about 0.9%; and the plasticizer is present in an amount up to about 0.5% or more.

24. A surface of claim 18 in which the mastic comprised about 65–70% sand; about 30–32% vinyl acetate homopolymer emulsion; about 0.5% octylphenoxypolyethoxyethanol; about 0.5% polyoxyethylene aryl ether; about 0.5% polydimethylsiloxane; and about 1% ethylene glycol.

* * * * *